(12) United States Patent
Frach et al.

(10) Patent No.: US 8,519,340 B2
(45) Date of Patent: Aug. 27, 2013

(54) HIGH DYNAMIC RANGE LIGHT SENSOR

(75) Inventors: Thomas Frach, Aachen (DE); Gordian Prescher, Cologne (DE)

(73) Assignee: Koninklijke Philips N.V., Eindhoven (NL)

(*) Notice: Subject to any disclaimer, the term of this patent is extended or adjusted under 35 U.S.C. 154(b) by 219 days.

(21) Appl. No.: 13/139,618

(22) PCT Filed: Nov. 19, 2009

(86) PCT No.: PCT/IB2009/055192
§ 371 (c)(1),
(2), (4) Date: Jun. 14, 2011

(87) PCT Pub. No.: WO2010/073136
PCT Pub. Date: Jul. 1, 2010

(65) Prior Publication Data
US 2011/0240865 A1    Oct. 6, 2011

Related U.S. Application Data

(60) Provisional application No. 61/139,735, filed on Dec. 22, 2008.

(51) Int. Cl.
*G01T 1/20* (2006.01)

(52) U.S. Cl.
USPC .......................................... 250/362

(58) Field of Classification Search
USPC ........................................... 250/362
See application file for complete search history.

(56) References Cited

U.S. PATENT DOCUMENTS

| | | | |
|---|---|---|---|
| 5,892,575 A | 4/1999 | Marino | |
| 7,723,694 B2 | 5/2010 | Frach et al. | |
| 2002/0024058 A1 | 2/2002 | Marshall et al. | |
| 2006/0215264 A1* | 9/2006 | Birk et al. | 359/487 |
| 2007/0182949 A1 | 8/2007 | Niclass | |
| 2008/0203309 A1* | 8/2008 | Frach et al. | 250/362 |
| 2008/0240341 A1* | 10/2008 | Possin et al. | 378/19 |
| 2010/0214654 A1* | 8/2010 | Birk et al. | 359/385 |

* cited by examiner

*Primary Examiner* — Marcus Taningco

(57) ABSTRACT

When detecting photons in a computed tomography (CT) detector, a sensor (10, 38) includes a photodiode that is switchable between liner and Geiger operation modes to increase sensing range. When signal to noise ratio (SNR) is high, a large bias voltage is applied to the photodiode (12) to charge it beyond its breakdown voltage, which makes it sensitive to single photons and causes it to operate in Geiger mode. When a photon is received at the photodiode (12), a readout transistor (18) senses the voltage drop across the photodiode (12) to detect the photon. Alternatively, when SNR is low, a low bias voltage is applied to the photodiode (12) to cause it to operate in linear mode.

21 Claims, 4 Drawing Sheets

HIGH DYNAMIC RANGE LIGHT SENSOR

CROSS REFERENCE TO RELATED APPLICATIONS

This application claims the benefit of U.S. provisional application Ser. No. 61/139,735 filed Dec. 22, 2008, which is incorporated herein by reference.

The present innovation finds particular application in medical imaging systems, e.g., involving computed tomography (CT) imaging. However, it will be appreciated that the described technique may also find application in nuclear cameras, other imaging systems, other imaging scenarios, other light sensing techniques, and the like.

CT scanners typically include an x-ray source and arrays of x-ray detectors secured respectively on diametrically opposite sides of a gantry. During a scan of a patient located within the bore of the gantry, the gantry rotates about a rotation axis while x-rays pass from the focal spot of the x-ray source through the patient to the detectors. In a high-resolution imaging mode, a large radiation dose passes through the subject as the gantry rotates at a high speed. In a fluoroscopic mode, the x-ray dose is much lower and the gantry may be held stationary.

Present CT imaging systems typically include a CT scanner and associated data acquisition and image reconstruction software, which produce a complete set of reconstructed images. An operator performs initial planar survey scans to identify a spatial position of a volume of interest, such as a heart, and to optimize other imaging parameters. In contrast-enhanced CT, a contrast agent is then administered, and low-dosage imaging is performed to monitor the contrast agent intake into the heart or other organ. When the image contrast due to contrast agent reaches a selected threshold, the operator initiates high resolution diagnostic imaging. Typically, the operator is given little guidance on optimizing the survey, monitoring, and diagnostic imaging steps. Typically, the operator gets only one attempt. If there is a problem, a second imaging session is deferred until the contrast agent washes out of the heart or other organ of interest. Once the diagnostic imaging is complete, the full CT data set is reconstructed. However, for classical sensors or detectors that operate only in one mode (e.g., Geiger or linear), photon sensing range is limited.

For many light-sensing applications, a wide, dynamic sensing range is desirable. Attempts at providing such a range have included using PIN or avalanche photodiodes. However, both types of sensors suffer from relatively high noise that limits the low end of the dynamic sensing range. On the other hand, silicon photomultipliers based on single photon avalanche photodiodes allow one to resolve low photon fluxes, but their dynamic range is limited by saturation effects.

Other attempts at increasing sensing range in medical imaging devices have included sensors with Geiger-mode regions and linear mode regions, such as are described in U.S. patent application Ser. No. 11/467,670, entitled "Digital silicon photomultiplier for TOF-PET" and filed on Aug. 28, 2006. However, such sensors do not include photodiodes that are switchable between Geiger mode and linear mode. Moreover, they do not use ambient light levels to trigger a switch between Geiger mode and linear mode for sensors in a CT device.

A typical readout circuit of a photodiode includes a photodiode that is reverse-biased to a few volts and is disconnected by opening a reset transistor. The photocurrent leads to a drop in the voltage over the photodiode over time. During the readout, the photodiode voltage is read by closing a readout transistor. The photodiode capacitance is typically much smaller than the data line capacitance. A source follower is used to decouple the diode capacitance from the capacitance of the data line.

Typically, the diode bias voltage ($V_{bias}$) is a few volts, and thus no charge multiplication takes place inside the photodiode. If the sensor is pixilated, the data lines represent individual columns of an image. The total flux can be computed by adding the fluxes of all individual pixels together, and can be done in an analog or digital manner, depending on the size and application of the sensor. For low light fluxes, the linear mode photocurrent is too small to be distinguished from the noise level. The noise has several sources: thermal noise inside the photodiode; amplification noise; digitization noise; external noise sources; etc.

The present application provides new and improved systems and methods for mitigating the effects of noise sources at low light levels using internal amplification inside the photodiode in order to provide a sensor that is switchable between linear and Geiger operation modes, which overcome the above-referenced problems and others.

In accordance with one aspect, a dual-mode light sensor for a diagnostic imaging system detector includes an array of photodiodes coupled to one or more scintillation crystals that convert received gamma rays into light, and a controller monitors light conditions and switches the photodiodes between two modes of operation, including Geiger mode and linear mode, based on the monitored light conditions.

According to another aspect, a method of extending sensing range for a gamma ray sensor includes measuring ambient light conditions at the sensor, including a signal-to-noise ratio (SNR) for gamma rays detected at the sensor, determining whether the measured SNR is greater than or equal to a predetermined threshold SNR, and applying a first bias voltage to the sensor to cause photodiodes therein to operate in Geiger mode if the measured SNR is greater than or equal to the predetermined threshold SNR. The method further includes applying a second bias voltage to the sensor to cause photodiodes therein to operate in linear mode if the measured SNR is less than the predetermined threshold SNR.

According to another aspect, a gamma ray sensor includes an array of scintillation crystals that convert received gamma rays into light, a photodiode coupled to each scintillation crystal and to a sensing transistor and a reset transistor, and a readout transistor coupled to the sensing transistor, wherein the readout transistor reads a voltage drop across the photodiode. The photodiode is charged $V_{ex}$ volts over its breakdown voltage by closing the reset transistor and thereafter operates in Geiger mode to sense single photons. The readout transistor senses a voltage drop of $V_{ex}$ volts across the photodiode when a photon is received by the photodiode.

One advantage is that the sensing range of the sensor or detector is increased.

Another advantage resides in switching between operation modes.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting the invention.

Figure 1:
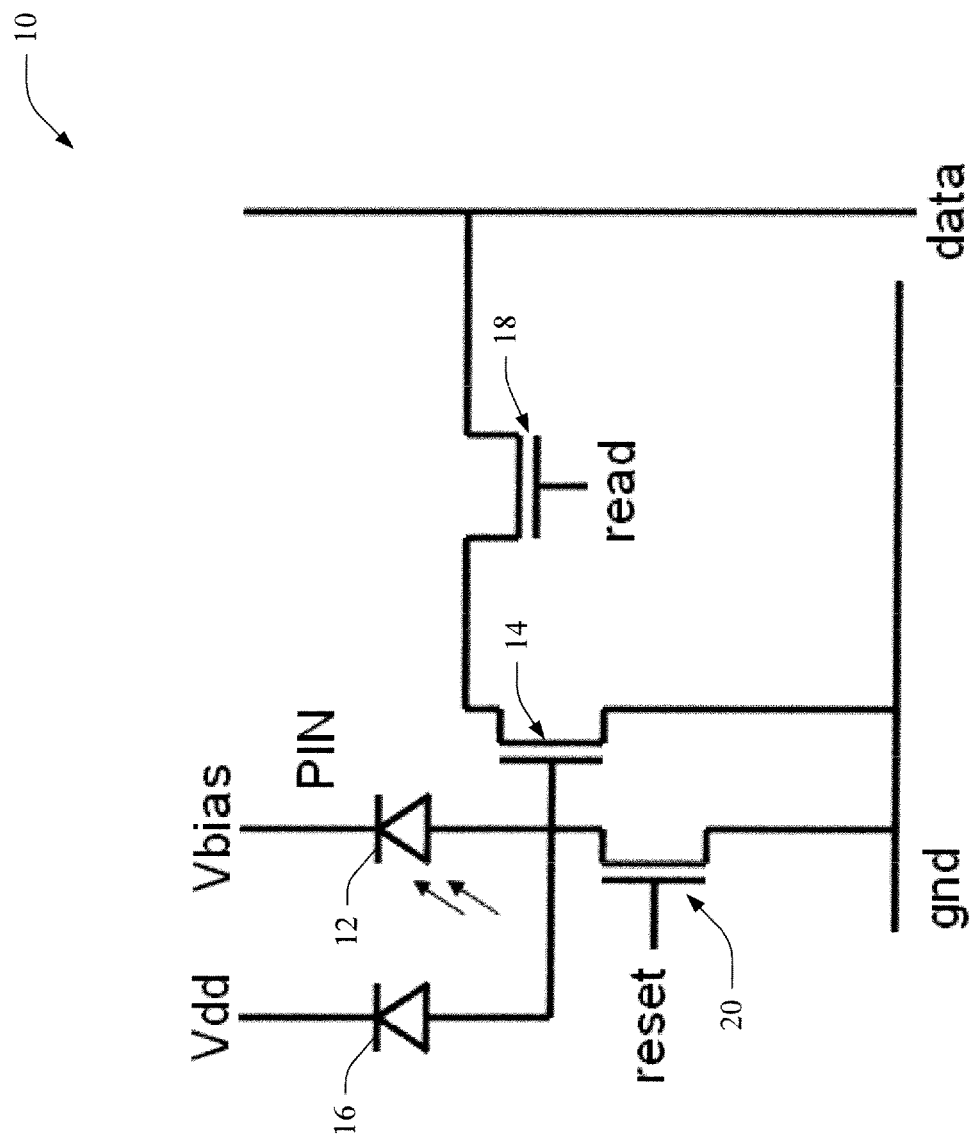
FIG. 1 illustrates a dual-mode light sensor that facilitates detecting light fluxes over a large dynamic sensing range, in accordance with various aspects set forth herein.

FIG. 1 illustrates a dual-mode light sensor 10 that facilitates detecting light fluxes over a large dynamic sensing range, in accordance with various aspects set forth herein. Specifically, the dynamic range of a light sensor (e.g., a photodiode) is extended down to multiple or single photon detection and counting. This is achieved by dynamically switching the sensor from linear mode into Geiger mode and vice versa. In this manner, the strengths of both linear mode and Geiger-mode sensors are combined to extend the dynamic range of the resulting sensor from single-photon detection and counting to fluxes several decades higher. The increased dynamic sensing range is achieved by automatically adjusting the operating point of a photodiode 12 in the sensor 10 depending on the light flux. During low light conditions, the photodiode is biased over the breakdown voltage and is sensitive to single photons in a counting mode. In high light conditions, the bias voltage is adjusted in the linear or weak avalanche region to allow the integration of the detected photons in the photodiode. For example, if the sensor 10 is operating in the linear mode and the noise statistics fall below a predetermined threshold, a controller can switch to Geiger mode. If the sensor is operating in Geiger mode and the output starts to saturate, then the controller switches the detector to the linear mode.

Internal amplification of the photocurrent is accomplished by increasing internal field strength to several 100 kV/cm. Thus, for a given thickness of the intrinsic region, sufficiently high bias voltage is applied to drive the photodiode into the avalanche mode. Additionally, the photodiode is designed to achieve homogeneous high field inside the photodiode and a controlled reduction of the field at the photodiode boundary. Associated readout circuitry is designed such that voltage drop due to the photocurrent remains within permissible limits for a sensing transistor 14 in the circuit. A protection diode 16 with a breakdown voltage $V_{dd}$ can be used to clip the peak voltage at the gate of a readout transistor 18 to protect it from gate oxide breakdown. If the voltage at the gate exceeds the sum of the breakdown voltage and the Thevenin equivalent voltage for the circuit ($V_{dd}+V_{th}$), the protection diode 16 becomes conductive and clips the voltage level to approximately $V_{dd}+V_{th}$.

Internal amplification in the linear avalanche mode may generate a statistical noise source due to the probabilistic nature of the amplification process. This excess noise adds to the thermal noise of the photodiode. Also, the gain in the avalanche region is highly temperature- and bias-dependent, and may be limited to approximately 10 to 100 if desired.

Increasing the bias voltage over the breakdown voltage drives the photodiode into the Geiger-mode region of operation. In this mode, the photodiode becomes sensitive to single photons and easily reaches gains of several millions. However, the photodiode becomes insensitive to the actual number of photons; the diode becomes non-linear with respect to the photon flux. Weak photon fluxes can be measured by counting one photon after another. However, the photodiode may experience "dead" times that limit the maximum acceptable flux to a few million photons per second. In another embodiment, the counting capability inside the Geiger region of operation is increased by disposing a plurality of photodiodes in each pixel, each photodiode being capable of detecting photons independently (e.g., as in a silicon photomultiplier).

The sensor 10 can be used to operate the photodiode 12 in Geiger mode when the bias voltage is set to $V_{bd}+V_{ex}$, $V_{bd}$ being the breakdown voltage of the photodiode, and $V_{ex}$ being the excess voltage. The photodiode is charged $V_{ex}$ volts over the breakdown voltage by closing a reset transistor 20. At this point, the photodiode becomes sensitive to single photons. Upon reception of a single photon, the voltage over the photodiode drops by $V_{ex}$. This voltage drop is read out by closing the readout transistor 18. All lines of the sensor 10 are read out separately, but instead of summing up the voltages in an analog manner, a threshold is placed on the voltage to facilitate counting the actual number of photons. That is, the data lines become binary signals in the Geiger mode, whereas they are analog signals in the linear mode. The actual number of photons is given by the digital sum over all pixels of the sensor. $V_{ex}$ may be limited to less than or equal $V_{dd}$ to protect the readout transistor gate oxide.

Figure 2:
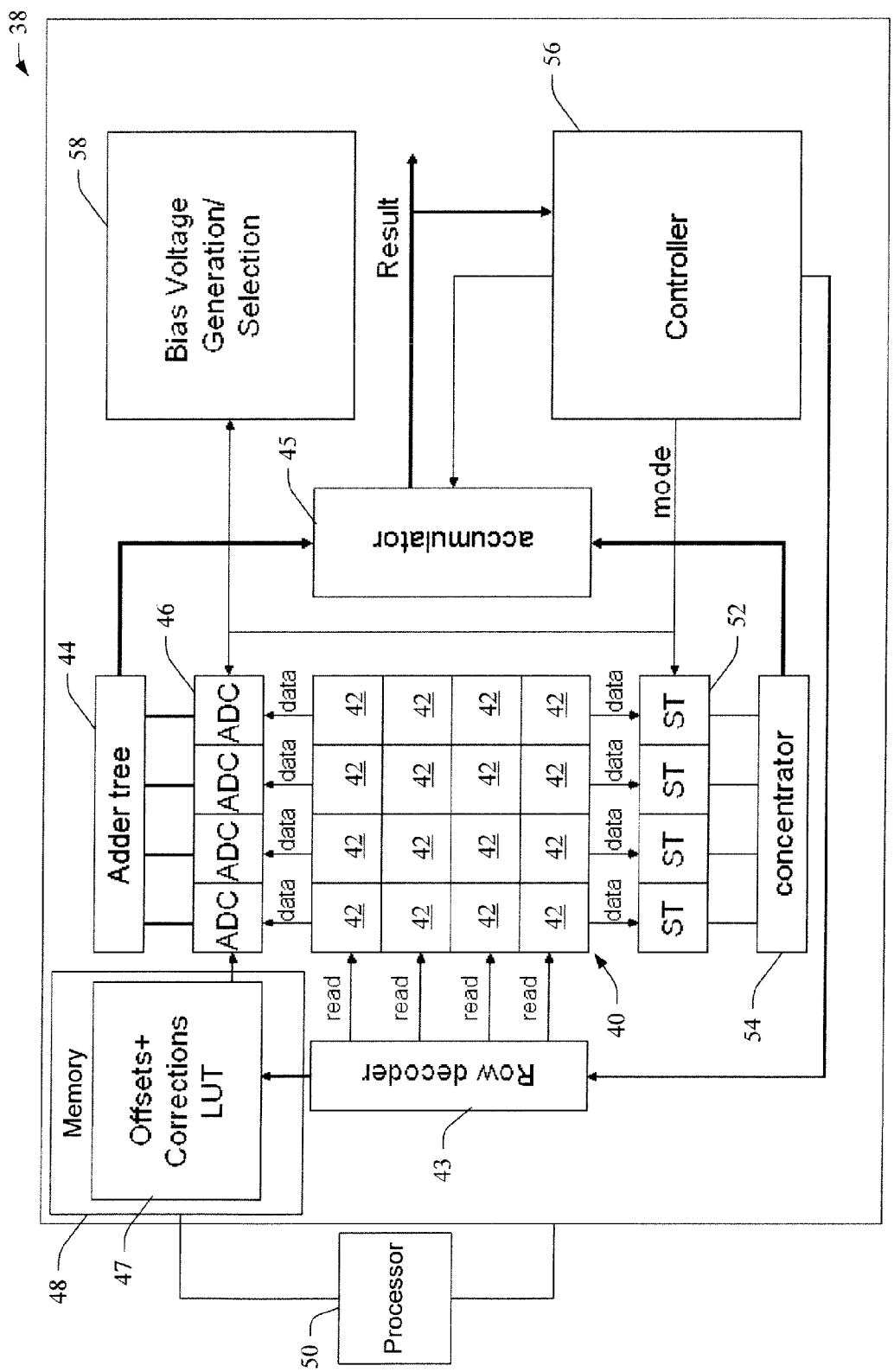
FIG. 2 illustrates a dual-mode sensor that is switchable between Geiger and linear modes, which facilitates providing a large dynamic sensing range, in accordance with various embodiments described herein.

FIG. 2 illustrates a dual-mode sensor 38 that is switchable between Geiger and linear modes, which facilitates providing a large dynamic sensing range, in accordance with various embodiments described herein. A photosensitive area 40 is subdivided into diode pixels 42. Contrary to CMOS imagers, each pixel 42 comprises a single-photon avalanche photodiode 12 (FIG. 1) connected to the circuit. The pixel lines of the sensor 38 are read out continuously by a row decoder 43 with a readout frequency $f_R$, where the readout of one line resets a previous line of the sensor. Depending on the mode of operation, the signals at the data lines are added in analog or digital manner. In the analog or linear mode, an adder 44 adds the voltage levels corresponding to the charge of the respective photodiodes, and outputs information to an accumulator 45 that generates a final result.

Additionally or alternatively, the analog signals are digitized by respective analog-to-digital converters (ADC) 46, and the digital values are added (as shown in FIG. 2). Digitization before summing has the advantage of permitting the inclusion of dark current subtraction and other corrections via table lookups (e.g., of one or more lookup tables 47 stored to a memory 48, which may be performed by a processor 50). In the Geiger or digital mode, a discriminator Schmidt trigger (ST) 52 determines whether the line is at "0" (ground) or "1" ($V_{ex}$), and the adder 44 is replaced by a concentrator circuit 54. The concentrator circuit converts an N-bit input vector into an M-bit binary value that contains the number of "1s" (e.g., lines at $V_{ex}$) in the N-bit input vector, and outputs information to the accumulator 45.

Additionally, a controller 56 continuously or periodically monitors the resulting light flux and determines which mode is best suited for the current light flux conditions. The change from one mode into the other takes place between two subsequent frames, and a bias voltage component 58 stabilizes the bias voltage (e.g., using voltage steps of several tens of volts within a time frame of nanoseconds or the like). The bias voltage component additionally controls the bias voltage applied to the ADCs and/or the STs depending on which mode of operation is indicated by the controller 56. The transition region is dependent on the operating conditions of the sensor, and the optimization criterion is the signal-to-noise ratio (SNR). However, the noise is affected by the environment and the sensor itself. Thus, the controller logic uses an externally programmable lookup table to allow maximum flexibility. The resulting digital signal is processed by digital signal processing circuitry in the processor 50, which is coupled to the sensor. The processing comprises the integration, filtering, shaping, clipping, and analysis of the signal. In this manner, the sensor is useful for all applications requiring high dynamic sensing range with an emphasis on extending the range towards single photon counting such as a photon-counting CT application or the like. In one embodiment, the sensor is employed in a photon counting mode (e.g., Geiger mode) in a spectral CT imaging system.

While in some embodiments, pixels are switched independently, systematically and/or according to a pattern, in one embodiment, all pixels are switched concurrently. For instance, when large amounts of light are detected, photodiodes in Geiger mode may begin to saturate, and linear mode becomes desirable. Accordingly, if a predetermined threshold amount of light is sensed, then the controller 56 switches the photodiodes to linear mode. Conversely, when SNR is high (e.g., above a predetermined SNR threshold), photodiodes in linear mode may not be sensitive enough to detect single photons. In this case, upon determining that the SNR threshold has been exceeded (e.g., noise has decreased below a predefined noise floor), the controller 56 switches the photodiodes to Geiger mode.

According to an example, a low-dose CT scanner sensor starts out with one or more sensors operating in linear mode. If an x-ray image is "shadowed" (e.g., by bone or the like), then the controller switches the sensors to Geiger mode to increase photodiode sensitivity and detect a number of gamma rays or photons per given unit of time.

In another example, the sensors are interchangeable on the surface of a detector module. For instance, a plurality of sensors can be mounted to the detector surface in an array or tiled arrangement. If a sensor malfunctions, it is replaced with a new pre-calibrated dual-mode sensor.

Figure 3:
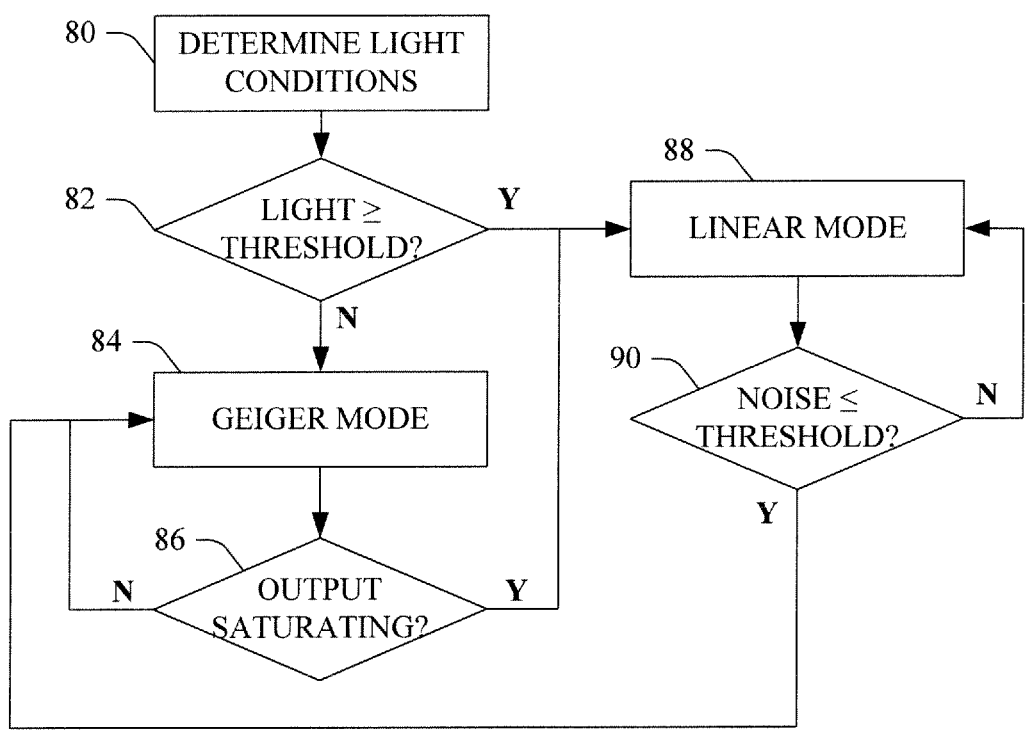
FIG. 3 illustrates a method of switching between linear and Geiger modes for a gamma ray sensor, in accordance with various aspects described herein.

FIG. 3 illustrates a method of switching between linear and Geiger modes for a gamma ray sensor, wherein the method is a loop that is run during the time of data acquisition, in accordance with various aspects described herein. At 80, ambient light levels are analyzed to determine light conditions. At 82, a determination is made regarding whether the ambient light is greater than or equal to a predetermined threshold. If not, then a high bias voltage is applied to photodiodes associated with respective pixels to cause the photodiodes to operate in Geiger mode so that pixel is capable of detecting one or a few photons.

At 84, a determination is made regarding whether the Geiger mode output is at or approaching a predetermined threshold saturation level, and if not, the method reverts to 82 where the photodiode continues to operate in Geiger mode. If the photodiode is at or near saturation, then the method proceeds to 88, where the bias voltage applied to the photodiodes of respective pixels is reduced to a low bias voltage that causes the photodiodes to operate in linear mode to permit detection of large numbers of photons in high light conditions. Similarly, if the determination at 82 indicates that ambient light is greater than or equal to the predetermined threshold level, then the method advances to 88 where the photodiodes are placed in linear operation mode using a low bias voltage.

Once in linear mode, the photodiodes are monitored to determine whether noise levels are less than or equal to a predetermined noise threshold, at 90. If not, then the method reverts to 88 for continued photodiode operation in linear mode. If so, then the method proceeds to 84, where photodiodes are placed in Geiger mode.

It will be appreciated that the described method(s) may be stored on a computer-readable medium (e.g., the memory 48 of FIG. 2 for instance) as computer-executable instructions that are executed by a processor or processors (e.g., the processor 50 and/or controller 56 of FIG. 2 for instance). As used herein, "computer-readable medium" refers to a data storage component or memory that stores electronic data and/or instructions.

Figure 4:
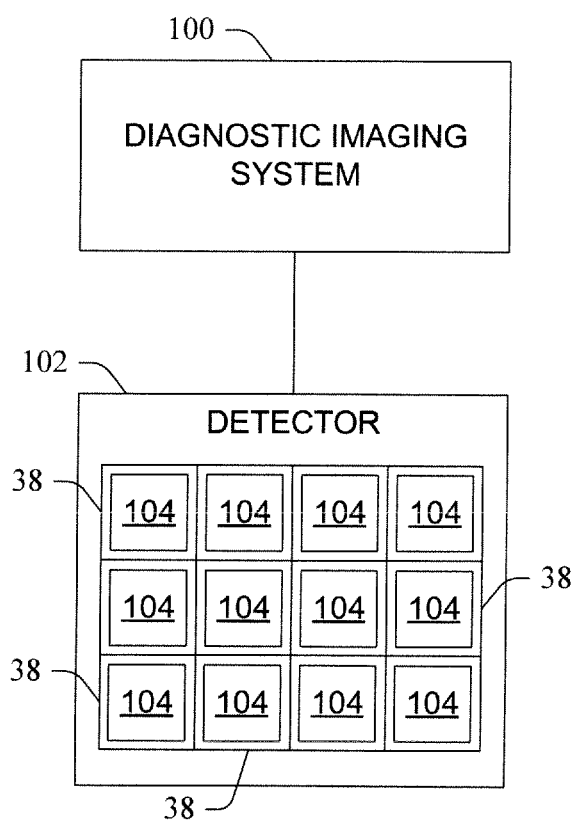
FIG. 4 is an illustration of a diagnostic imaging system 100 that employs a detector having an array of scintillation crystals thereon, each scintillation crystal being coupled to a sensor, in accordance with one or more aspects described herein.

FIG. 4 is an illustration of a diagnostic imaging system 100 that employs a detector 102 having an array of scintillation crystals 104 thereon, each scintillation crystal being coupled to a sensor 38, in accordance with one or more aspects described herein. In one embodiment, the diagnostic imaging system is a CT imaging system. In another embodiment, the diagnostic imaging system is a nuclear imaging system, such as a positron emission tomography imaging system. The scintillation crystals 104 are arranged in an array or tiled arrangement, as are the sensors 38, such that there are minimal or no gaps between the crystals. Each crystal and its associated sensor is removable to facilitate replacement of damaged or non-functional crystals and/or sensors. In this manner, the detector 102 can be maintained in an operational state should one or more sensors (or crystals) fail.

It will be appreciated that the systems and methods described herein may be used in a spectral CT imaging system, in accordance with one embodiment. Spectral CT uses additional information inherent in the full spectrum of an x-ray beam to add clinical value to CT, which facilitates tissue discrimination, which in turn facilitates differentiating between materials (e.g., tissues containing calcium and iodine, etc.) that can appear similar on traditional monochromatic CT images. For instance, spectral CT permits the x-ray beam to be split into its component energies, or spectrum, by advanced detection technology. More advanced, multi-energy or photon counting detection is facilitated using the dual mode sensor described herein, when the sensor operates in Geiger mode.

Patients thus benefit not only from improved images that facilitate more confident diagnosis, but also from decreased x-ray radiation dose. Using spectral information to create virtual non-contrast images can eliminate a need for traditional non-contrast acquisitions in some cases. Eliminating these non-contrast images can also have an economic benefit, as it shortens examination time and facilitates increased patient throughput Spectral CT also provides imaging sensitivity to contrast agents, thereby enabling the detection of lower (more localized) concentrations and decreasing the injected volume. Improving the sensitivity of CT to low amounts of contrast agent further enables the use of novel contrast agents, allowing CT to provide molecular and physiological information.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A dual-mode light sensor for an imaging system detector, including:
   an array of photodiodes coupled to one or more scintillation crystals that convert received rays into light; and
   a controller that monitors a signal-to-noise ratio (SNR) of signals output by the photodiodes and switches the photodiodes between two modes of operation, including a Geiger mode and a linear mode, based on the monitored signal-to-noise ratio.

2. The sensor according to claim 1, further including:
an externally programmable lookup table that the controller accesses when selecting the mode of operation.

3. The sensor according to claim 1, wherein the controller places the photodiodes in the Geiger mode when the signal-to-noise ratio (SNR) is above a predetermined threshold level.

4. The sensor according to claim 3, further including:
a bias voltage generator that increases a bias voltage applied to the photodiodes to a level that causes the photodiodes to operate in the Geiger mode.

5. The sensor according to claim 1, wherein the controller places the photodiodes in the linear mode when a signal-to-noise ratio (SNR) of detected rays is at or below a predetermined threshold level.

6. The sensor according to claim 5, further including:
a bias voltage generator that decreases a bias voltage applied to the photodiodes to a level that causes the photodiodes to operate in the linear mode.

7. The sensor according to claim 1, wherein the photodiodes are arranged in columns and further including:
an analog to digital converter (ADC) coupled to each column of photodiodes that converts detected gamma ray information from analog format into digital format; and
an adder that adds the voltage levels corresponding to a charge of the respective photodiodes to generate cumulative voltage information.

8. The sensor according to claim 7, further including:
a Schmidt trigger coupled to each column that determines whether the column of photodiodes is at "0" (ground) or "1" ($V_{excess}$); and
a concentrator that converts an N-bit input vector into an M-bit binary value that contains the number of "1s" representing columns of pixels at $V_{excess}$ in the N-bit input vector.

9. The sensor according to claim 8, further including:
an accumulator that receives the M-bit binary value and the cumulative voltage information and outputs information related to scintillation events detected in the one or more scintillation crystals.

10. The sensor according to claim 7, wherein the photodiodes define pixels that are arranged in rows and further including:
a row decoder that reads each row of the photodiodes; and
an offset and corrections lookup table that is accessed by a processor that performs dark current subtractions on read-out pixel data and provides correction information to the ADCs.

11. A diagnostic imaging system detector having a plurality of the sensors of claim 1 disposed thereon in a tiled arrangement, each sensor being removably coupled to the detector and coupled to a one or a scintillation crystal and an array of scintillation crystals.

12. The sensor according to claim 1, wherein each photodiode corresponds to a pixel.

13. A method of extending sensing range for a gamma ray sensor, including:
measuring ambient light conditions at the sensor, including a signal-to-noise ratio (SNR) for rays detected at the sensor;
determining whether the measured SNR is greater than or equal to a predetermined threshold SNR;
applying a first bias voltage to the sensor to cause photodiodes therein to operate in a Geiger mode if the measured SNR is greater than or equal to the predetermined threshold SNR; and
applying a second bias voltage to the sensor to cause photodiodes therein to operate in a linear mode if the measured SNR is less than the predetermined threshold SNR.

14. The method according to claim 13, further including:
switching the sensor between the Geiger mode and the linear mode as a function of the measured SNR.

15. The method according to claim 14, further including:
switching the sensor from the Geiger mode to the linear mode when the measured SNR falls below the predetermined threshold SNR.

16. The method according to claim 14, further including:
switching the sensor from the linear mode to the Geiger mode when the measured SNR equals or rises above the predetermined threshold SNR.

17. A non-transitory computer-readable medium having stored thereon computer-executable instructions for performing the method according to claim 13.

18. A gamma ray sensor comprising:
an array of photodiodes;
a biasing circuit which is controlled to bias the photodiodes to a Geiger mode or to a linear mode;
a signal-to-noise detector which detects a signal-to-noise ratio of output signals from the photodetectors;
a controller which controls the biasing circuit to bias the photodiodes to the Geiger mode in response to the detected signal-to-noise ratio being above a threshold and to bias the photodiodes to the linear mode in response to the signal-to-noise ratio being at or below the threshold.

19. A gamma ray sensor according to claim 18, further including:
one or more scintillation crystals that convert received gamma rays into light;
each photodiode coupled to the one or more scintillation crystals and to a sensing transistor and a reset transistor;
a readout transistor coupled to the sensing transistor, that reads a voltage drop across the photodiode;
wherein the photodiode is charged $V_{ex}$ volts over its breakdown voltage by closing the reset transistor and thereafter operates in the Geiger mode to sense single photons; and
wherein the readout transistor senses a voltage drop of $V_{ex}$ volts across the photodiode when a photon is received by the photodiode.

20. The sensor according to claim 19, further including:
a protection diode that clips a peak voltage at a gate of the readout transistor to protect the readout transistor from breakdown.

21. An imaging system including a plurality of sensors according to claim 19.

* * * * *